United States Patent
De Laforcade (10) Patent No.: US 7,114,640 B2
(45) Date of Patent: Oct. 3, 2006

(54) APPARATUS AND METHOD FOR DISPENSING PRODUCT

(75) Inventor: Vincent De Laforcade, Rambouillet (FR)

(73) Assignee: L'Oreal S.A., Paris (FR)

( * ) Notice: Subject to any disclaimer, the term of this patent is extended or adjusted under 35 U.S.C. 154(b) by 119 days.

(21) Appl. No.: 10/302,819

(22) Filed: Nov. 25, 2002

(65) Prior Publication Data

US 2003/0116589 A1    Jun. 26, 2003

(30) Foreign Application Priority Data

Nov. 23, 2001   (FR) .................................. 01 15182

(51) Int. Cl.
   *B65D 88/54*   (2006.01)

(52) U.S. Cl. .............................. 222/321.4; 222/321.9; 222/376; 222/377

(58) Field of Classification Search ................ 222/207, 222/321.5, 321.7, 321.9, 382, 454, 321.4, 222/376–377

See application file for complete search history.

(56) References Cited

U.S. PATENT DOCUMENTS

| | | |
|---|---|---|
| 1,896,405 A | 2/1933 | Hauser |
| 3,029,001 A | 4/1962 | Blish |
| 3,347,420 A * | 10/1967 | Donoghue ................. 222/129 |
| 3,369,713 A | 2/1968 | Godschalk, Jr. |
| 3,379,136 A | 4/1968 | Corsette |
| 3,402,860 A * | 9/1968 | Torongo, Jr. ................ 222/207 |
| 4,159,791 A | 7/1979 | Crutcher |
| 4,324,349 A | 4/1982 | Kaufman |
| 4,776,498 A | 10/1988 | Maerte et al. |
| 5,259,536 A | 11/1993 | Reyman |
| 5,346,105 A | 9/1994 | Onneweer |
| 5,476,198 A | 12/1995 | Jouillat et al. |
| 6,179,170 B1 | 1/2001 | Bachand |
| 6,398,080 B1 * | 6/2002 | De LaForcade ............ 222/207 |
| 6,431,408 B1 | 8/2002 | De Laforcade |
| 6,601,739 B1 * | 8/2003 | Lacout ..................... 222/321.5 |

FOREIGN PATENT DOCUMENTS

| | | |
|---|---|---|
| EP | 0 626 321 | 11/1994 |
| FR | 2 393 279 | 12/1978 |
| FR | 2 799 449 A1 | 4/2001 |
| FR | 2 817 244 | 5/2002 |
| JP | 50-17337 | 2/1975 |

(Continued)

OTHER PUBLICATIONS

Co-pending U.S. Appl. No. 09/902,592; Retention Element, Dispensing Device, and Method of Use, Frank Lacout, filed Jul. 12, 2001.

(Continued)

*Primary Examiner*—Philippe Derakshani
(74) *Attorney, Agent, or Firm*—Finnegan, Henderson, Farabow, Garrett & Dunner, L.L.P.

(57) ABSTRACT

A product dispensing device includes a container having an opening and a retaining member in the vicinity of the opening. The container is configured to contain a product, and the retaining member defines a dosing cavity for containing an amount of product capable of being dispensed when the device is in an upright orientation. The retaining member comprises a peripheral sidewall. A portion of the device comprises an edge defining an orifice in flow communication with the container and the dosing cavity. At least part of the edge extends inside the peripheral sidewall and/or an extension of the peripheral sidewall at a non-zero distance therefrom. The orifice is positioned to define a maximum filling level of the dosing cavity.

78 Claims, 6 Drawing Sheets

FOREIGN PATENT DOCUMENTS

| | | |
|---|---|---|
| JP | 63-54654 | 4/1988 |
| JP | 2-135465 | 11/1990 |
| JP | 7-257619 | 10/1995 |
| JP | 2001-158489 | 6/2001 |

OTHER PUBLICATIONS

English language Derwent Abstract of FR 2 393 279, Dec. 29, 1978.

* cited by examiner

APPARATUS AND METHOD FOR DISPENSING PRODUCT

The present invention relates to a device for dispensing product, for example, a cosmetic or treatment product that may be used, for example, for make-up, treatment, or hygiene of the skin or the hair. The device may dispense doses of product. Dosed dispensing may be desired for products such as those used, for example, for treating or restoring hair loss.

The present invention relates to a device comprising a retention component delimiting a dosing cavity, intended to be filled, for example, by total or partial inversion of the device. The product may be dispensed by means of a pump when the device is in an upright position. The device is, for example, equipped with a pump that dispenses the product contained in the dosing cavity. The dispensing may be carried out when the device is positioned such that the pump lies above the free surface of liquid in the container containing the product to be dispensed.

European Patent Publication 0 626 321 discloses an assembly equipped with a pump that is supplied, without a riser tube, from a retention component having a base and a sidewall with an exterior diameter less than the interior diameter of the neck of the container. The retention component furthermore has, around the upper end of its sidewall, flexible tabs flaring towards the neck of the container in a direction that makes an angle with the vertical in order to carry out filling of the retention component. Between two consecutive flexible tabs there is hence an opening, one edge of which is delimited by the upper edge of the sidewall of the retention component. The maximum filling level of the retention component, making it possible to obtain the dose of product, is then determined by the portion of the openings that is delimited by the upper edge of the sidewall of the retention component.

In practice, it is found that such a device does not allow good filling of the retention component to be ensured, in particular, towards the end of use of the contents of the device. This is because a significant variation in the degree of filling of the retention component is observed, depending on the way in which the container is moved from a totally or partially inverted position into an upright dispensing position. Furthermore, since the filling level is determined by a portion of an opening formed by the sidewall of the retention component, even a very minor inclination of the device when the retention component is in the filled position makes the retention component overspill through the opening. The dose of product retained in the retention component is then less than the maximum dose that can be retained. Therefore, the filling level is not reproducible from one use to another.

U.S. Pat. Nos. 3,369,713 and 5,259,536 describe bottles that permit dosed dispensing of a product through the use of a retention component that is filled by inverting the bottle. The dose of product is then dispensed by compressing the walls of the tube, in order to create an increased pressure inside the bottle, and hence to eject the product from the retention component through a dispensing orifice.

According to an embodiment described in U.S. Pat. No. 3,369,713, the retention component is filled through a tube, arranged parallel with the axis of the bottle, and having a first end that communicates with the interior of the container and a free second end that opens into the retention component. The maximum filling level of the retention component is therefore delimited by the opening defined by this second end. As soon as the bottle is inclined, however, some of the product can flow through the tube via this opening.

The embodiment described in U.S. Pat. No. 5,259,536 is also filled through a tube arranged parallel with the axis of the bottle, extending over the entire axial height of the retention component, and having axial slots through which the product can flow. In this device the maximum filling level of the retention component is delimited by the lower edge of these slots. Some of the product can flow through the tube via these slots as soon as the bottle is inclined.

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

According to one aspect, a device for dispensing a product may comprise a container having an opening and a retaining member in the vicinity of the opening. The container may be configured to contain a product, and the retaining member may comprise a first part and a second part. The first part may define a dosing cavity for containing an amount of product capable of being dispensed when the device is in an upright orientation, and the first part may comprise a peripheral sidewall. The second part may at least partially define a region. The retaining member may comprise a junction between the first part and the second part, and a cross-sectional dimension of the region in at least one plane may be greater than a cross-sectional dimension of the cavity in a plane containing the junction. A portion of the device may comprise an edge defining an orifice in flow communication with the container and the dosing cavity. At least part of the edge may extend inside the peripheral sidewall and/or an extension of the peripheral sidewall at a non-zero distance therefrom. For purposes of this application, "an extension of the peripheral sidewall" refers to an imaginary surface continuing from an end of the peripheral sidewall in an upward direction substantially parallel to a longitudinal axis of the container. The orifice may be positioned to define a maximum filling level of the dosing cavity, and the maximum filling level of the dosing cavity may be substantially in the plane containing the junction.

According to another aspect, a device for dispensing a product may comprise a container having an opening and a longitudinal axis. The container may be configured to contain a product. The device also may comprise a retaining member in the vicinity of the opening. The retaining member may define a dosing cavity for containing an amount of product capable of being dispensed when the device is in an upright orientation. The retaining member may comprise a peripheral sidewall. A portion of the device may comprise an edge defining an orifice in flow communication with the container and the dosing cavity. At least part of the edge may extend inside the peripheral sidewall and/or an extension of the peripheral sidewall at a non-zero distance therefrom, and at least part of the edge may extend at least partly outside a plane that is both perpendicular to the longitudinal axis and intersecting the edge (i.e., the edge is not completely in a plane perpendicular to the axis). The orifice may be positioned to define a maximum filling level of the dosing cavity.

According to yet another aspect, a device for dispensing a product may comprise a container having an opening and a retaining member in the vicinity of the opening. The container may be configured to contain a product, and the retaining member may define a dosing cavity for containing an amount of product capable of being dispensed when the device is in an upright orientation. The retaining member may also comprise a peripheral sidewall. The device may further comprise a pump configured to dispense product. A portion of the device may comprise an edge defining an orifice in flow communication with the container and the dosing cavity. At least part of the edge may extend inside the peripheral sidewall and/or an extension of the peripheral sidewall at a non-zero distance therefrom. The orifice may be positioned to define a maximum filling level of the dosing cavity.

When the device is not inclined, the free surface of the product contained in the dosing cavity may be formed in a plane perpendicular to a longitudinal axis that corresponds to a horizontal plane. When the device is inclined with respect to the longitudinal axis, since the free surface of the product still remains in a horizontal plane, the plane perpendicular to the longitudinal axis varies with respect to the plane of the free surface. The variation of a point in the plane increases with its distance from the longitudinal axis. In at least some embodiments, the point on the free surface of the product contained in the cavity that is furthest away from the longitudinal axis lies at the level of at least a part of the peripheral sidewall defining the dosing cavity. For example, when the dosing cavity is formed along the longitudinal axis of the device and it has a circular cross-section, all of the peripheral sidewall delimits the points on the free surface which are at the greatest distance from the longitudinal axis. Hence, the further the orifice is away from the peripheral sidewall, the less the variation of the free surface in contact with the edge delimiting the orifice. When the device is inclined, less product may consequently flow through an orifice that lies at a distance from the peripheral sidewall than through an orifice that lies in the peripheral sidewall.

In some embodiments, when the dosing cavity is filled to the maximum amount, and when the device is inclined, some of the product may flow into the region with a larger cross-section, thereby lowering the level of the free surface of the product with respect to the edge delimiting the orifice. When the device returns into the vertical position, the product which has flowed into the larger cross-section region may return into the dosing cavity. The presence of such a region, which makes it possible to retain some of the product when the device is in the inclined position, may allow the quantity of product flowing through the orifice to be limited.

Optionally, all of the edge delimiting the orifice may lie inside the peripheral sidewall and/or an extension of the peripheral sidewall, at a distance therefrom. In this way, the orifice may be further away from the sidewall of the dosing cavity.

The orifice may extend at least partly outside a plane perpendicular to the longitudinal axis of the container. The maximum filling level of the cavity may then be determined by the lowest portion of the edge delimiting the orifice. For example, the lowest portion of the edge may be the portion of the edge closest to the longitudinal axis of the container.

For example, the orifice may extend at least partially in a plane forming an oblique angle with the longitudinal axis. The inclination of the orifice may be selected in such a way that, when device is inclined, all of the orifice remains above the free surface of the product, which is inclined relative to the orifice.

The orifice may be formed by the free end of a tube with a cross-section that is, for example, polygonal, circular, oval, or in the shape of a haricot bean (i.e., the edible portion of a kidney bean). Optionally, the tube may extend substantially axially from a base of the cavity as far as the free end.

In some embodiments, the tube is straight and vertical when the device is in the upright position, such that the surplus product in the cavity readily flows through the tube to the container.

According to one aspect of the invention, the portion of the retaining member that at least partially defines the larger cross-section region may extend, starting from the junction, as far as an interior surface of the container. The portion of the retaining member may also at least partially define at least one passage which, in response to at least partial inversion of the device, allows one-way flow of the product coming from the container to the dosing cavity.

The term "one-way flow" is intended to refer to a flow condition where a flow rate in one direction is greater than a flow rate in an opposite direction. For example, the flow through the above-mentioned passage has a rate that is greater when the device is inverted into the upside-down position than upon return into the upright position. In other words, the section of the at least one passage is larger when the device is in the upside-down position than when it is in the upright position. Optionally, the at least one passage may open under the pressure of the product when the device is inverted, and close in a virtually leak-tight fashion upon return to the upright position. In some embodiments, the retaining member and, in particular, the portion of the retaining member that partially defines the larger cross-section region, does not permit return, through the passage, of the product that has flowed above the portion during inversion of the device, irrespective of the manual movements by which the device is inverted and, in particular, the speed with which the inversion movement is carried out.

The portion of the retaining member that partially defines the region with a larger cross-section may comprise an elastically deformable diaphragm, a peripheral edge of which extends as far as the vicinity of the interior surface of the container. The diaphragm may have a portion that is capable of coming into contact with the interior surface of the container when the device is in the upright position, and of being moved away from the interior surface of the container under the pressure of the product in response to the partial inversion.

Optionally, the portion of the diaphragm that is capable of coming into contact with the interior surface of the container is an annular portion separated from the peripheral edge of the diaphragm. The portion may lie, for example, at a distance of from 0.5 mm to 3 mm away from the peripheral edge. Such a configuration may make it possible to obtain sealing when the device is in the upright position, irrespective of the tolerances used during its manufacture.

The diaphragm may optionally be made, at least partly, of an elastically deformable material, in particular a material selected from thermoplastic or cross-linked elastomers. In this way, the portion of the diaphragm that is applied against the interior surface of the container in the upright position can readily be moved away from the surface under the pressure of the product, and can readily be re-applied against the surface upon return into the upright position.

For example, the material may be selected from silicones, natural or synthetic latices, EPDMs, polyurethanes, mixtures of polypropylene and SIBS, SEBS or EPDM, very low-density polyethylenes, mixtures based on polyester glycols (TPU) or polyether glycols (PEBA and COPE), and flexible polyvinyl chlorides (PVCs).

Optionally, the diaphragm may have a thickness that decreases in the direction of the interior surface of the container. This configuration may make it possible, for example, to facilitate fitting of the diaphragm in the container and also to facilitate opening and closing of the passage.

Also, the portion that partially defines the larger cross-section region may be inclined in the direction of the dosing cavity. It may form an angle of, for example, from 60 to 89° with the longitudinal axis of the container. This characteristic may make it possible to assist delivery to the dosing cavity of all or some of the product lying above the portion.

According to another aspect, the portion of the retaining member that at least partially defines the larger cross-section region may be a wall that extends, starting from the junction, as far as an edge at least partially lying at a distance from an interior surface of the container. The dosing cavity is then filled, still by at least partial inversion of the device, through a passage formed between the edge of the wall of the retaining member and the internal surface of the container.

According to some embodiments, the edge of the wall that defines the larger cross-section region may be extended by angularly-spaced flexible tabs, as far as an interior wall surface of the container. The dosing cavity may then be filled through the openings defined between two consecutive tabs. Optionally, the tabs are inclined towards the dosing cavity, thereby facilitating delivery of the product to the cavity.

Optionally, the retaining member may be obtained by moulding in a single piece, which may make it possible, for example, to manufacture the retaining member at low cost and to facilitate fitting the retaining member in the container.

The retaining member may comprise at least one interlocking member fitted on an edge of the container that defines the opening of the container.

According to an aspect, the device may furthermore comprise a pump intended to dispense the product. The pump may be secured to a riser tube, one end of which lies substantially in the vicinity of a base of the dosing cavity. The presence of a riser tube may make it possible to produce a dosing cavity with a larger volume.

The pump may be secured to a hoop that is fitted in a fixed way on a neck of the container, for example, by engagement or by screwing. The pump may be associated with an actuator, such as a push button, for actuating the pump.

The device according to aspects of the invention may be used for the packaging and dispensing of a cosmetic and/or treatment product, such as a product for the skin or hair, for example, a nutritive treatment of the roots or a scalp treatment.

In one aspect, a method of dispensing a product may comprising providing a dispensing device according to one or more of aspects disclosed herein, flowing product into the dosing cavity, and dispensing the product from the cavity.

In another aspect, the dispensing of the product from the cavity may include dispensing substantially all of the product within the cavity. In still other aspects, the flowing of the product into the cavity may include flowing the product into the cavity via the orifice and/or flowing product from the container through the orifice.

The method of dispensing may further include inverting the device and/or flowing excess product out of the cavity via the orifice.

The term "providing" is used in a broad sense, and refers to, but is not limited to, making available for use, manufacturing, enabling usage, giving, supplying, obtaining, getting a hold of, acquiring, purchasing, selling, distributing, possessing, making ready for use, forming and/or obtaining intermediate product(s), and/or placing in a position ready for use.

Aside from the structural arrangements described above, the invention could include a number of other arrangements, such as those explained hereinafter. It is to be understood that both the foregoing description and the following description are exemplary and explanatory only and are not restrictive of the invention.

The accompanying drawings are included to provide a further understanding of the invention and are incorporated in and constitute a part of this specification. The drawings illustrate some exemplary embodiments of the invention and, together with the description, serve to explain some principles of the invention. In the drawings.

Reference will now be made in detail to exemplary embodiments of the invention, examples of which are illustrated in the accompanying drawings. Wherever possible, the same reference numbers are used throughout the drawings and in the description to refer to the same or like parts.

Figure 1:
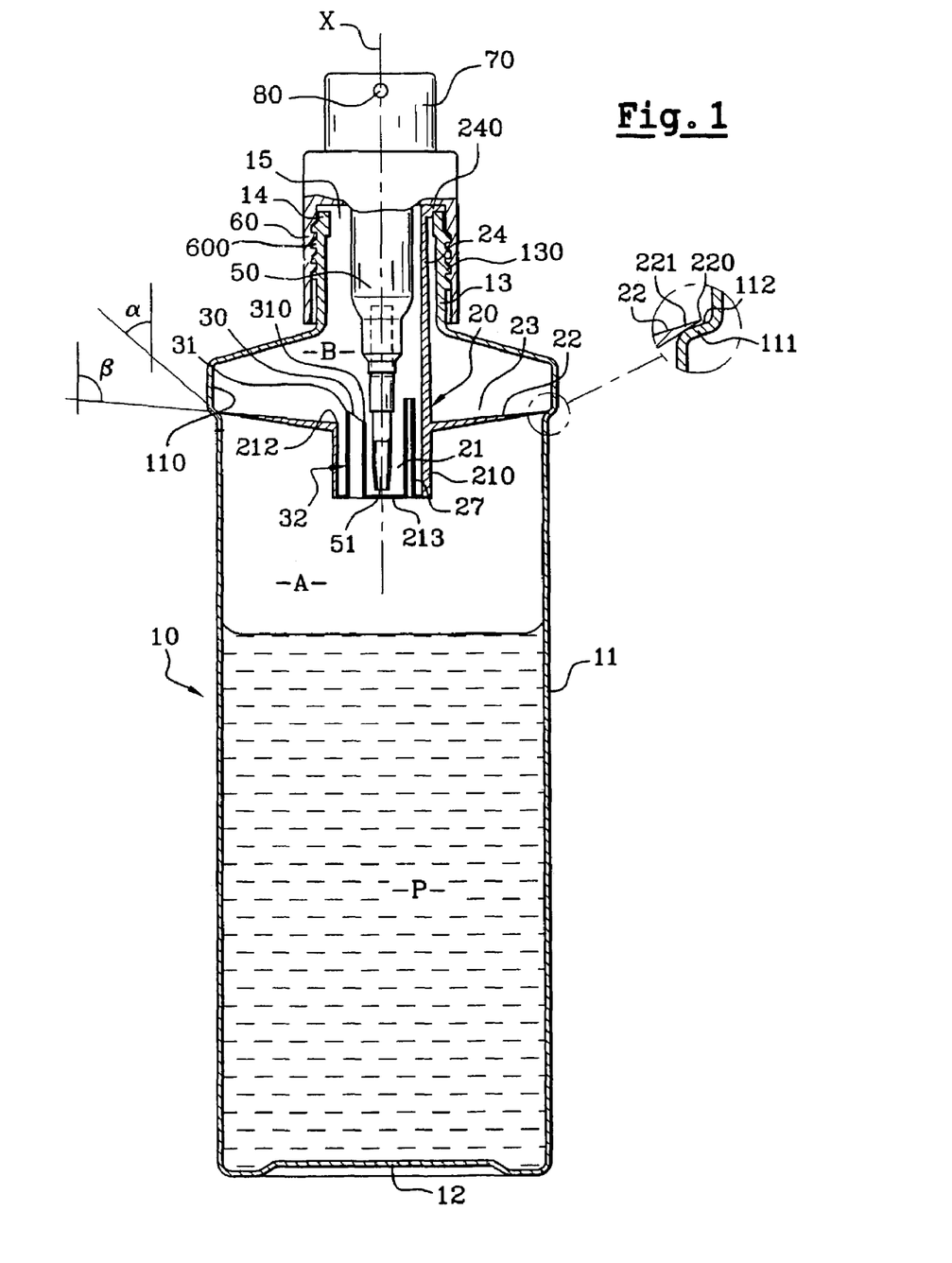
FIG. 1 is a partial axial section view of an exemplary embodiment of a dispensing device.

Referring to FIG. 1, an exemplary device comprises a container 10 having a longitudinal axis X. The container 10 is configured to hold product P. The container 10 may have a substantially cylindrical body 11 with a circular cross-section, one end of which may be closed by a base 12. The container 10 may have a different cross-sectional shape, for example, a square, a triangle, an oval, or the like. An end of the container 10 opposite the base may have a neck 13. A free edge 14 of the neck may define an opening 15, in the vicinity of which a retaining member 20 may be is fitted along the axis X of the container 10. The exterior surface of the neck 13 may comprise a screw thread 130 capable of interacting with a screw thread 600 provided, for example, on the interior surface of a mounting hoop 60. The retaining member delimits a cavity for example, a dosing cavity 21, the contents of which are intended to be dispensed when the device is in an upright position, by any means known to the person skilled in the art that permits upright dispensing.

In one aspect, a pump 50 may be provided for dispensing product. The pump 50 is supplied with product contained in the retaining member 20, which will be described in detail below. The pump may be fixed to the container 10 via the mounting hoop 60. An actuation component, for example, a push-button 70, makes it possible to actuate the pump and discharge product through at least one outlet orifice 80.

One or more of the container 10, the retaining member 20, the pump 50, the hoop 60, and the push-button 70, may be formed by moulding a thermoplastic material, for example, a polypropylene or a polyethylene.

Figure 2A:
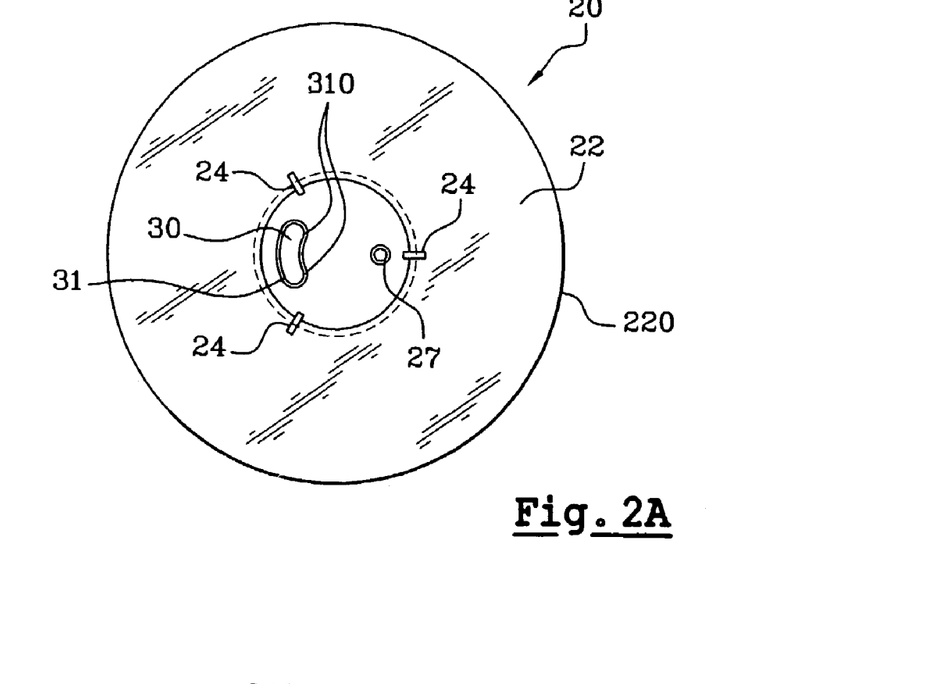
FIG. 2A is a plan view of a retaining member of the device shown in FIG. 1.
Figure 2B:
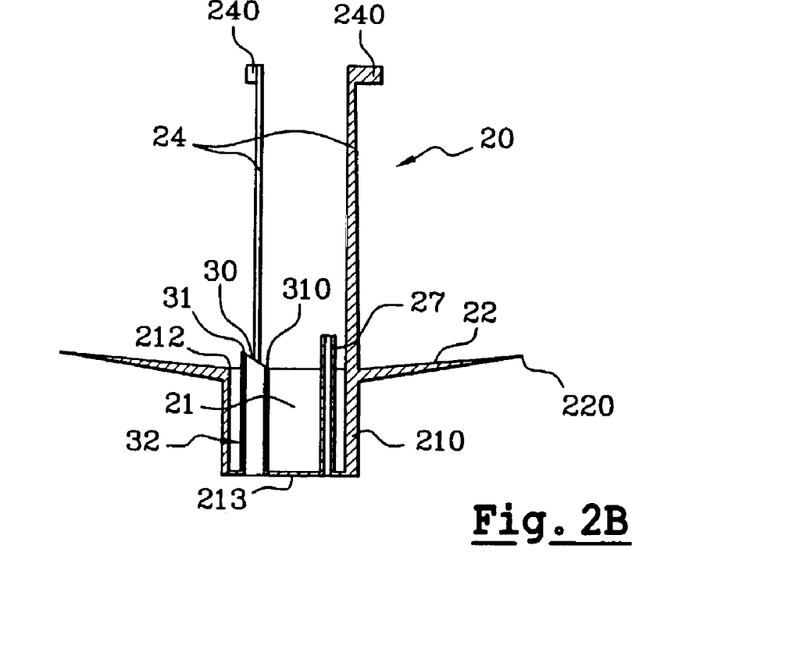
FIG. 2B is an axial section view of the retaining member of the device shown in FIG. 1.

The retaining member 20, which is isolated in FIGS. 2A and 2B and inside the device in FIG. 1, may comprise a continuous peripheral sidewall 210 closed at one end by a base 213. The sidewall 210 may be a cylinder with a circular cross-section, the base 213 of which may be a flat disc. The sidewall 210 may have a different cross-sectional shape, for example, a square, a triangle, an oval, or the like. The sidewall 210 may have any shape, as may the base, which, for example, may be concave or have a U-shaped profile. The sidewall 210 may be extended axially by interlocking tabs 24, for example, three regularly-spaced tabs. Each tab 24 may end in a lip 240 that, when assembled, bears on the free edge 14 of the neck of the container 10.

On the opposite side from the base 213, the sidewall 210 ends in a second end 212. From the second end, a diaphragm 22 extends substantially transversely to the longitudinal axis X as far as an interior wall surface 110 of the container 10. As can be seen in FIG. 1, the diaphragm 22 may separate a first region A of the container 10, which the product P occupies when the device is in the upright position, from a second region B adjacent to the opening 15 of the container 10.

When the device is in the upright position, the diaphragm 22 defines, with a portion of the interior wall surface 110 of the container 10, a region 23 having a cross-section larger than the cross-section of the dosing cavity 21 at the level of the edge 212. The diaphragm 22 is furthermore capable of defining, in combination with the interior wall surface 110 of the container, an annular passage 40, shown only in FIG. 3A. The diaphragm 22 is configured to allow one-way flow of the product to the dosing cavity 21, through the annular passage 40, in response to at least partial inversion of the device.

The diaphragm 22 may be an elastically deformable diaphragm. A peripheral edge 220 of the diaphragm 22 extends as far as the vicinity of the interior wall surface 110 of the container 10, as can be seen in FIG. 1. The diaphragm comprises an annular portion 221, which when the device is in the upright position is capable of coming into contact, for example, substantially leak-tight contact, with a shoulder (described below) provided in the interior wall surface 110 of the container 10. The term "substantially leak-tight" arrangement of the diaphragm 22 relates to a condition where essentially none of the product which passed above the diaphragm can flow into the first region A of the container 10 upon returning to the upright position. Under the pressure of the product in response to the partial inversion of the device, the diaphragm 22 moves away from the wall so as to define, with the interior wall surface 110, the passage 40.

The diaphragm 22 may be made of an elastically deformable material selected from, for example, thermoplastic or cross linked elastomers. For example, the material may include silicones, natural or synthetic latices, EPDMs, polyurethanes, mixtures of polypropylene and SBS, SEBS or EPDM, very low-density polyethylenes, mixtures based on polyester glycols (TPU) or polyether glycols (PEBA and COPE), and flexible polyvinyl chlorides (PVCs). Such a material may have a hardness of from 20 Shore A to 40 Shore D, for example, from 40 Shore A to 75 Shore A. The elasticity of the material may range from 0.5 to 5 MPa, for example, from 0.8 to 2 MPa (tensile stress at 100% elongation). In one aspect, the material may comprise a silicone elastomer.

In one aspect, the diaphragm 22 may be inclined in a direction of the cavity 21. The diaphragm may form, with the longitudinal axis X of the device, an angle $\beta$ equal, for example, to about 85°. This inclination contributes to delivering the product to the dosing cavity 21.

So that virtually all of the product that has flowed through the passage 40 into the second region B of the container 10 is delivered to the dosing cavity 21, a diaphragm forming a continuous circlet without interruption may be used.

The interior wall surface 110 of the container forms a shoulder 111, which is configured to receive the annular portion 221 of the diaphragm 22 when the device is in the upright position. In one aspect, the upper internal surface 112 of the shoulder makes an angle $\alpha$ equal, for example, to about 60° with the longitudinal axis X of the container, so as to receive the annular portion 221 of the diaphragm 22 and keep it inclined.

In order to facilitate fitting of the retaining member 22 in the device, the diaphragm 22 may have a thickness that decreases in a direction of the interior wall surface 110 of the container 10.

Alternatively, the diaphragm 22 may be provided with at least one valve (not shown) that is capable of opening under the pressure of the product, in response to the partial inversion of the device, and of re-closing when the device returns to the upright position.

The overflow system of the dosing cavity 21 according to the exemplary embodiment shown in FIGS. 1–5C includes a tube 32, which is open at both of its ends and has a cross-section in the shape of a haricot bean. The tube 32 may have a different cross-sectional shape, for example, a circle, a square, a triangle, an oval, or the like. The tube 32 extends from the base 213 of the cavity 21, in a direction parallel to the axis X to a free end 31 that delimits an orifice 30. Because of the presence of the pump 50 along the axis X, the tube 32 lies substantially at a distance from the axis X. It should be appreciated that the overflow tube 32 could be formed along the axis X if the system for dispensing the product is arranged differently. The orifice 30 may be formed in an oblique plane, which is inclined with respect to a plane perpendicular to the axis X. The lowest portion 310 of the edge 31 that delimits the orifice 30 may then determine a maximum filling height of the dosing cavity 21. The volume of the dosing cavity 21 may be on the order of a few milliliters.

The lower portion 310 of the edge 31, which delimits the maximum filling level of the dosing cavity 21, may be the portion of the edge 31 lying closest to the axis X, that is the portion of the edge 31 that which is furthest away from the peripheral sidewall 210.

Furthermore, the lowest portion 310 of the edge 31, which delimits the maximum filling height of the dosing cavity 21, may lie at an axial height corresponding substantially to the axial height of the second end 212 of the sidewall 210, from which the diaphragm 22 extends. Thus, the larger cross-section region 23 may be formed at the axial height corresponding to the maximum filling level of the dosing cavity 21.

An air passage tube 27 may be provided in the dosing cavity 21, in order to accelerate the filling of the dosing cavity 21, as well as its emptying, by assisting the passage of air between the two regions A, B defined by the diaphragm 22. The air passage tube 27 may be formed inside the cavity 22 in a direction parallel to the axis X. The air passage tube 27 may open above the free end 31 that defines the orifice 30, so that it does not affect the maximum filling level of the dosing cavity 21.

The retaining member 20 may be formed, for example, in a single piece, by moulding. The diaphragm may be moulded with an angle of 90° with respect to the sidewall 210 of the dosing cavity 21. It should be appreciated that the diaphragm may be moulded with a smaller angle so as to obtain inclination in the direction of the dosing cavity. After the container 10 has been filled with product P, the retaining member 20 may be inserted into the container 10 through the neck 13, until the lip 240 bears on the neck 13 of the container 10. The inclination of the diaphragm 22 towards the dosing cavity 21 may be facilitated as the annular portion 221 of the diaphragm is applied onto the upper internal surface 112 of the shoulder 111, which is inclined by 60°. The pump 50 may then be positioned inside the container 10.

Figure 3A:
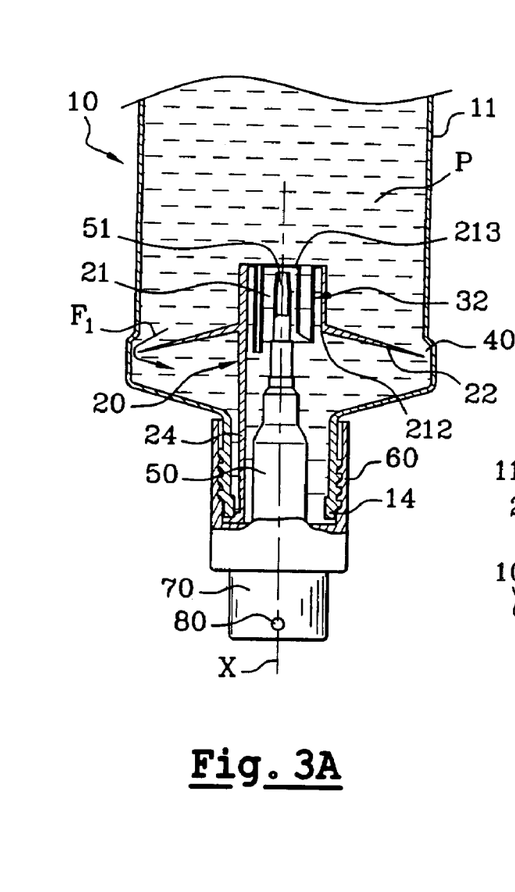
FIGS. 3A–3C are partial sectional views of the device shown in FIG. 1 illustrating an exemplary operation of the device.
Figure 3B:
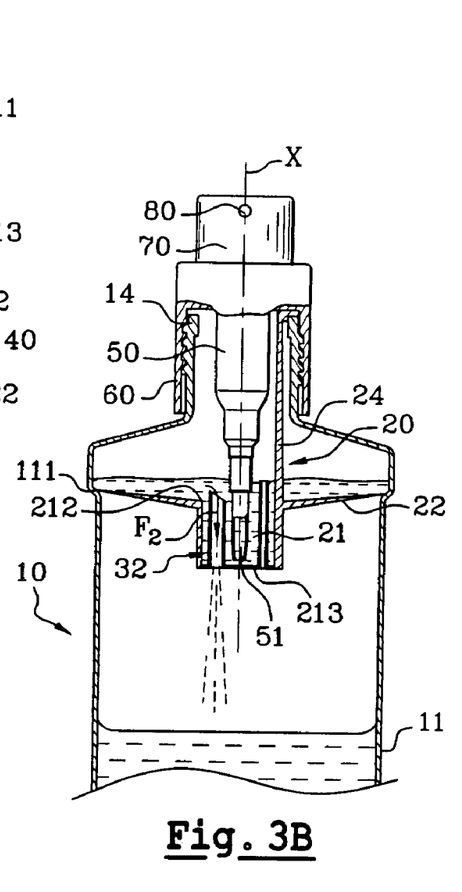
Figure 3C:
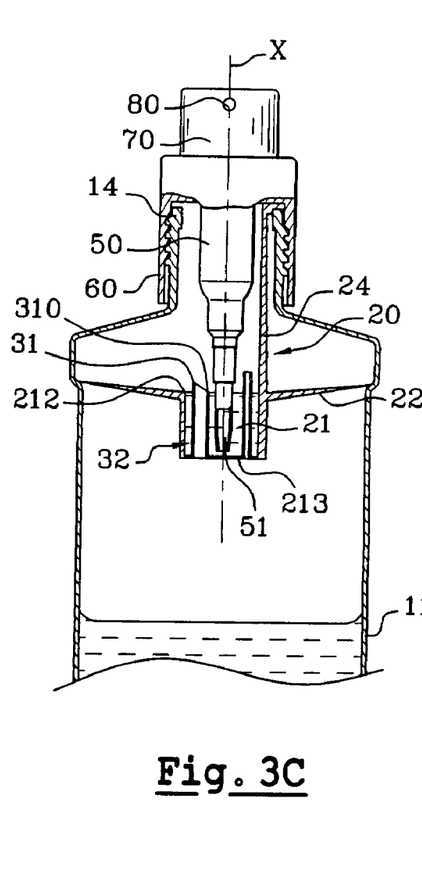

FIGS. 3A–3C, to which reference is now made, illustrate various stages during filling of the dosing cavity 21 of the device, which has just been described with reference to FIG. 1.

In FIG. 3A, the device is inverted to an upside-down position so that the weight of the product P as well as the flexibility of the diaphragm 22 allow the diaphragm 22 to flex in a direction of the opening 15 of the container 10. The passage 40 may then be defined between the peripheral edge 220 and the interior wall surface 110 of the container 10. Product P flows through the passage 40, as indicated by the arrow F1. If the residual quantity of product is sufficient, a portion of product P may also flow through the tube 32 into the dosing cavity 21. A part of the second region B may then be filled with product P. The second region B is dimensioned such that its volume is significantly larger than that of the dosing cavity.

When the device is inverted from the upside-down position in FIG. 3A to the upright position in FIG. 3B, the diaphragm 22 resumes its initial position under the combined effect of the weight of the product in the second region B and the elasticity of the material forming the diaphragm. The diaphragm 22 may then contact the shoulder 111, so that the passage 40 is closed. The product P present above the diaphragm then flows into the dosing cavity 21. Any excess product in the dosing cavity 21 flows back into the region A of the container 10 by over-spilling via the orifice 30, as indicated by the arrow F2. The maximum volume of the dosing cavity may be obtained when the free surface of the product in the dosing cavity 21 reaches the lowest portion 310 of the free end 31 of the tube 32, as illustrated in FIG. 3C. The dosing cavity 21 may be therefore always filled in substantially the same way, irrespective of the conditions under which the container 10 is inverted from the upright position to the upside down position.

After filling the dosing cavity 21, the content of the dosing cavity 21 may be dispensed by the pump 50, which may be actuated by means of the push-button 70. The product may then enter the pump 50 via the riser tube 51 having a free end lying near the base of the dosing cavity 21.

Figure 4A:
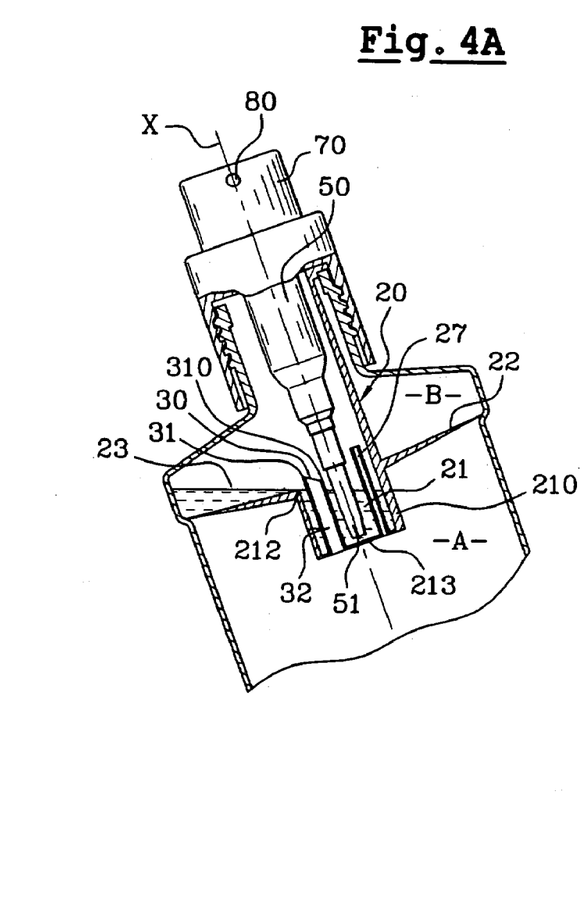
FIGS. 4A and 4B are partial sectional views of the device shown in FIG. 1 illustrating an exemplary operation of the device.
Figure 4B:
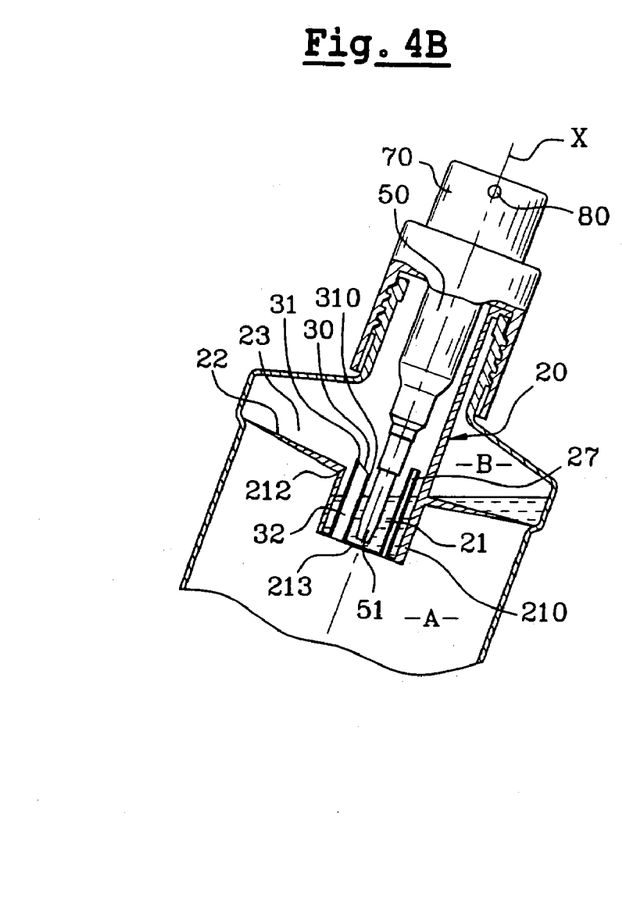

Occasionally, after having filled the dosing cavity 21 to its maximum, but before dispensing the content of the dosing cavity 21, a user inclines the device with respect to its axis X, as illustrated in FIGS. 4A and 4B, to which reference is now made. Irrespective of the inclination angle with respect to the vertical, the product retained in the dosing cavity 21 cannot flow through the orifice 30 defined by the free end 31 of the tube 30.

When the device is tilted toward the side of the tube 32, as illustrated in FIG. 4A, the product contained in the dosing cavity 21 flows into the part of the region 23 lying on the side of the tube 32, thereby lowering the level of the free surface of the product below the lowest portion 310 of the free end 31 of the tube 32. The product cannot then reach the orifice 30. Even if the user dispenses the product in this position, the product initially retained in the dosing cavity 21 will be dispensed because, as the product still located in the dosing cavity 21 is being dispensed, the product which is located in the region 23 flows back into the dosing cavity 21 as the cavity 21 becomes emptied.

When the device is tilted toward the side opposite the tube 32, as illustrated in FIG. 4B, the product contained in the dosing cavity 21 flows into the part of the region 23 lying opposite the tube 32, thereby also moving away from the orifice.

Figures 5A, 5B, 5C:
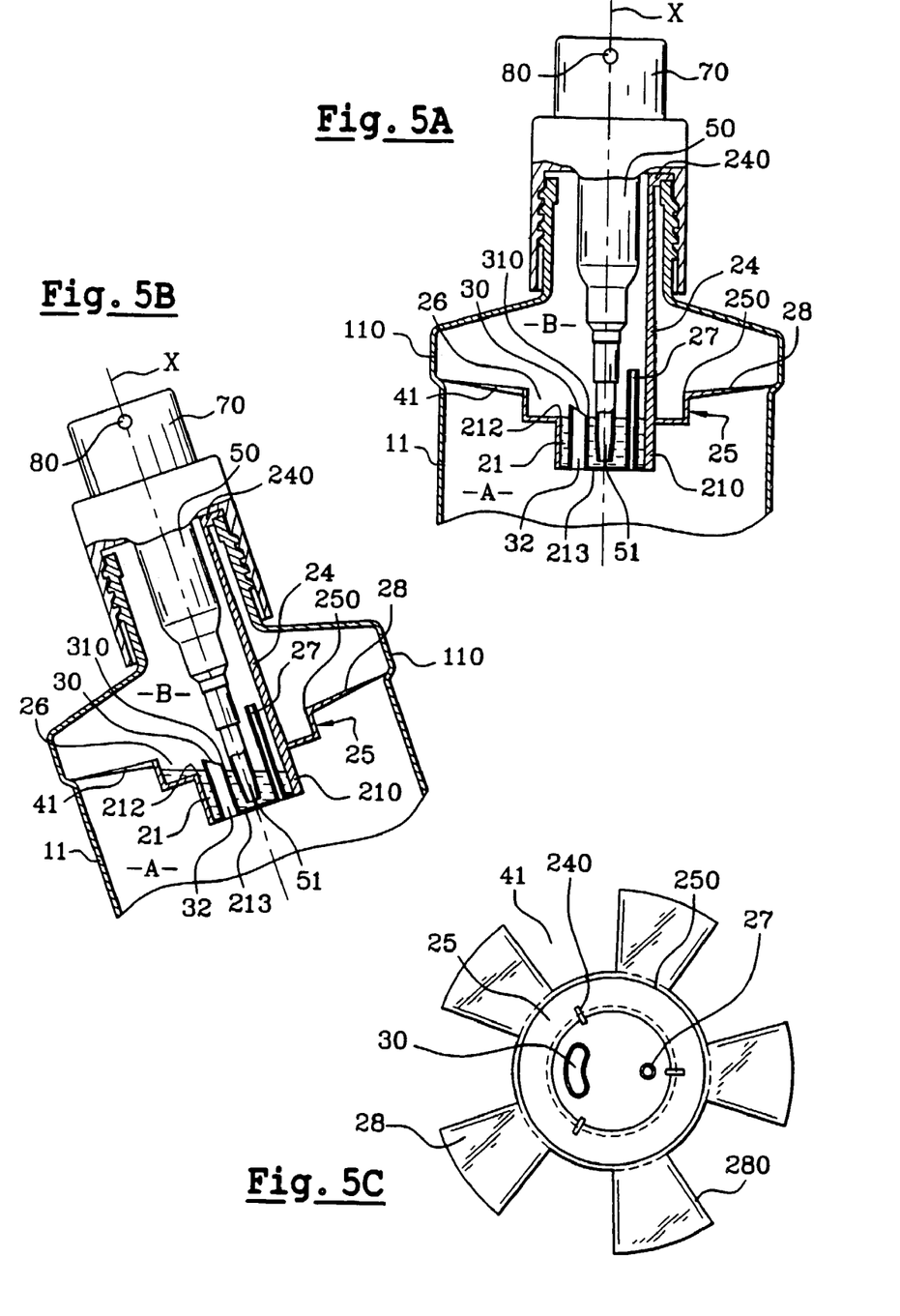
FIGS. 5A and 5B are partial axial section views of an alternative embodiment of the dispensing device.
FIG. 5C is a plan view of the retaining member of the device shown in FIGS. 5A and 5B.

FIGS. 5A to 5C illustrate a second embodiment of the device, which differs from the previous embodiment in that the retaining member 20, illustrated in FIG. 5C, does not comprise a diaphragm.

Referring now to FIGS. 5A–5C, the peripheral sidewall 210 of the dosing cavity 21 ends, on the opposite side from the base 213, in a junction 212 from which, a wall, for example, a substantially rigid wall 25 extends. The wall 25 may be a continuous wall, which comprises a first annular portion formed substantially transversely to the axis X, at the end of which a second portion is formed in a direction substantially parallel to the axis X, which ends in an edge 250. The edge 250 lies at a distance from the interior wall surface 110 of the container 10. The wall 25 delimits a region 26 with a cross-section larger than the cross-section of the dosing cavity at the level of the junction 212.

Starting from the edge 250 of the wall 25, flexible tabs 28 are formed substantially transversely to the axis X and extend outward toward the interior wall surface 110 of the container. The flexible tabs are advantageously inclined towards the dosing cavity 21 and are provided with lips 280 on their outwardly-extending borders. Passages 41 may be delimited between two consecutive flexible tabs 28. The wall 25 and the flexible tabs 28 separate a first region A of the container, which the product P occupies when the device is in the upright position, from a second region B which is adjacent to the opening 15 of the container.

The rest of the device is identical to the one described in accordance with FIG. 1.

In order to fill the dosing cavity 21, the device is inverted to an upside-down position so that product occupying the region A of the container 10 flows into the region B through the passages 41. When the device is inverted to the upright position, the product located in the region B is delivered to the dosing cavity 21 at least partly because the flexible tabs 28 are inclined towards the cavity 21, with the lips 280 improving the guidance of product to the cavity 21. The product then flows through the overflow orifice 30 until the free surface of the product reaches the lowest portion 310 of the free end of the tube 32, as shown in FIG. 5A, so that only the dosing cavity 21 is filled.

In the same way as for the first embodiment described in accordance with FIG. 1, when the user tilts the device toward the side of the tube 32, as illustrated in FIG. 5B, the product contained in the dosing cavity 21 flows into the region 26 lying on the side of the tube 32, thereby lowering the level of the product below the lowest portion 310 of the free end of the tube 32. The product cannot then reach the orifice 30.

Figure 6A:
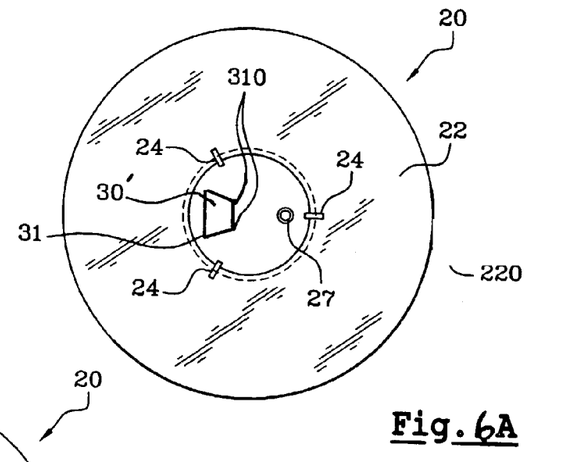
FIGS. 6A–6C are plan views of alternative retaining members of the device shown in FIG. 1.
Figure 6B:
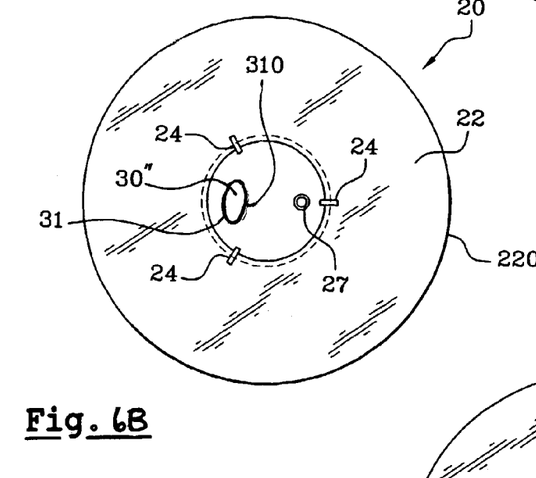
Figure 6C:
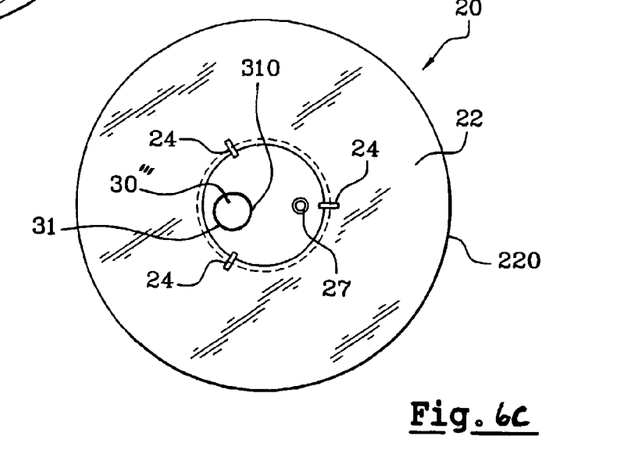

Referring now to FIGS. 6A–6C, retaining members having orifices 30', 30", 30'" with various shapes are shown. Each orifice 30', 30", 30'" is formed by the free end of the tube 32. Thus, the tube forming the orifice 30' has a polygonal cross-section, the tube forming the orifice 30" has an oval cross-section, and the tube forming orifice 30'" has a circular cross-section.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. A device for dispensing a product, comprising:
a container having an opening, the container being configured to contain a product; and
a retaining member in the vicinity of the opening, the retaining member comprising
a first part defining a dosing cavity for containing an amount of product capable of being dispensed when The device is in an upright orientation, the first part comprising a peripheral sidewall at least partially defining the dosing cavity, and
a second part at least partially defining a region,
wherein the retaining member comprises a junction between the first part and the second part,
wherein a cross-sectional dimension of the region in at least one plane is greater than a cross-sectional dimension of the cavity in a plane containing the junction, and
wherein a portion of The device comprises an edge defining an orifice in flow communication with the container and the dosing cavity, at least part of the edge extending inside at least one of the peripheral sidewall and an extension of the peripheral sidewall at a non-zero distance therefrom, the orifice being positioned to define a maximum filling level of the dosing cavity, the maximum filling level of the dosing cavity being substantially in the plane containing the junction.

2. The device according to claim 1, wherein all of the edge that defines said orifice is inside at least one of the peripheral sidewall and extension of the peripheral sidewall.

3. The device according to claim 1, wherein the container has a longitudinal axis and the orifice extends at least partly out from a plane perpendicular to said axis.

4. The device according to claim 3, wherein the orifice at least partially extends in a plane forming an oblique angle with said axis.

5. The device according to claim 2, wherein the maximum filling level of the cavity is defined by a portion of said edge closest to said axis.

6. The device according to claim 1, further comprising a tube, wherein the orifice is formed by a free end of the tube.

7. The device according to claim 6, wherein a cross-section of the tube is one of a polygonal shape, a circular shape, an oval shape, and a shape of a haricot bean.

8. The device according to claim 6, wherein the first part includes a base partially defining the cavity, and wherein the tube extends in a direction substantially parallel to a longitudinal axis of the container from the base to the free end.

9. The device according to claim 1, wherein the second part extends, from said junction to an interior surface of the container, the second part at least partially defining at least one passage allowing one-way flow of product from the container to the cavity in response to at least partial inversion of The device.

10. The device according to claim 9, wherein the second part comprises an elastically deformable diaphragm having a peripheral edge near the interior surface of the container, said diaphragm having a contacting portion configured to contact the interior surface of the container when The device is in the upright position and to move away from the interior surface under pressure of product in response to the at least partial inversion.

11. The device according to claim 10, wherein said contacting portion comprises an annular portion separated from a peripheral edge of said diaphragm.

12. The device according to claim 10, wherein said diaphragm comprises an elastically deformable material.

13. The device according to claim 12, wherein the material is selected from thermoplastic and cross-linked elastomers.

14. The device according to claim 12, wherein the material is selected from silicones, natural and synthetic latices, EPDMs, polyurethanes, mixtures of polypropylene and at least one of SBS, SEBS, and EPDM, very low-density polyethylenes, mixtures based on at least one of polyester glycols (TPU) and polyether glycols (PEBA and COPE), and flexible polyvinyl chlorides (PVCs).

15. The device according to claim 10, wherein said diaphragm has a thickness that decreases in a direction towards the interior surface of the container.

16. The device according to claim 9, wherein said second part slopes downward in a direction of the cavity.

17. The device according to claim 16, wherein said second part forms an angle of from about 60° to about 89° with a longitudinal axis of the container.

18. The device according to claim 1, wherein said second part comprises a second wall extending from said junction to an edge, the edge at least partially lying at a distance from an interior surface of the container.

19. The device according to claim 18, wherein a plurality of angularly-spaced tabs extend radially from the edge to an interior surface of the container.

20. The device according to claim 19, wherein the flexible tabs slope downward towards the cavity.

21. The device according to claim 1, wherein the retaining member comprises a single-piece, molded structure.

22. The device according to claim 1, wherein the retaining member comprises at least one interlocking member mounted on an edge of the container defining the opening.

23. The device according to claim 1, further comprising:
a pump configured to dispense product; and
a riser tube coupled to the pump, one end of the riser tube being substantially near a base of the cavity.

24. The device according to claim 23, further including a hoop secured to the pump, the hoop being coupled to a neck of the container.

25. The device according to claim 24, wherein the hoop is fixedly coupled to the neck.

26. The device according to claim 24, wherein the hoop is coupled to the neck by one of a screw fit and an interference fit.

27. The device according to claim 23, further including an actuator configured to actuate said pump.

28. The device according to claim 27, wherein the actuator comprises a push button.

29. A method of dispensing a product, the method comprising:
providing The device of claim 1;
flowing product into the cavity; and
dispensing the product from the cavity.

30. The method of claim 29, wherein the dispensing of the product from the cavity comprises dispensing substantially all of the product within the cavity.

31. The method of claim 29, wherein the flowing of the product into the cavity comprises flowing the product into the cavity via the orifice.

32. The method of claim 29, wherein the flowing of the product into the cavity comprises flowing product from the container through the orifice.

33. The method of claim 29, further comprising inverting The device.

34. The method of claim 29, further comprising flowing excess product out of the cavity via the orifice.

35. A device for dispensing a product, comprising:
a container having an opening and a longitudinal axis, the container being configured to contain a product; and
a retaining member in the vicinity of the opening, the retaining member defining a dosing cavity for containing an amount of product capable of being dispensed when The device is in an upright orientation, the retaining member comprising a peripheral sidewall at least partially defining the cavity,
wherein a portion of The device comprises an edge defining an orifice in flow communication with the container and the dosing cavity, at least part of the edge extending inside at least one of the peripheral sidewall and an extension of the peripheral sidewall at a non-zero distance therefrom, the edge extending at least partly outside a plane that is both perpendicular to the longitudinal axis and intersecting the edge, the orifice being positioned to define a maximum filling level of the dosing cavity.

36. The device according to claim 35, wherein the orifice at least partially extends in a plane forming an oblique angle with said axis.

37. The device according to claim 35, wherein the maximum filling level of the cavity is defined by a portion of said edge closest to said axis.

38. The device according to claim 35, further comprising a tube, wherein the orifice is formed by a free end of the tube.

39. The device according to claim 38, wherein the cavity includes a base, and wherein the tube extends in a direction substantially parallel to said longitudinal axis from the base of the cavity to the free end.

40. The device according to claim 35, wherein the retaining member comprises a second part extending from the peripheral sidewall to an interior surface of the container, the second part at least partially defining at least one passage allowing one-way flow of product from the container to the cavity in response to at least partial inversion of The device.

41. The device according to claim 40, wherein the second part comprises an elastically deformable diaphragm having a peripheral edge near the interior surface of the container, said diaphragm having a contacting portion configured to contact the interior surface of the container when The device is in the upright position and to move away from the interior surface under pressure of product in response to the at least partial inversion.

42. The device according to claim 41, wherein said contacting portion comprises an annular portion separated from a peripheral edge of said diaphragm.

43. The device according to claim 41, wherein said diaphragm comprises an elastically deformable material.

44. The device according to claim 41, wherein said diaphragm has a thickness that decreases in a direction towards the interior surface of the container.

45. The device according to claim 40, wherein said second part slopes downward in a direction of the cavity.

46. The device according to claim 40, wherein said second part comprises a second wall extending from said peripheral sidewall to an edge, the edge at least partially lying at a distance from an interior surface of the container.

47. The device according to claim 46, wherein a plurality of angularly-spaced tabs extend radially from the edge to an interior surface of the container.

48. The device according to claim 47, wherein the flexible tabs slope downward towards the cavity.

49. The device according to claim 35, wherein the retaining member comprises at least one interlocking member mounted on an edge of the opening of the container.

50. The device according to claim 35, further comprising:
a pump configured to dispense product; and
a riser tube coupled to the pump, one end of the riser tube being substantially near a base of the cavity.

51. The device according to claim 50, further including a hoop secured to the pump, the hoop being coupled to a neck of the container.

52. The device according to claim 50, further including an actuator configured to actuate said pump.

53. A method of dispensing a product, the method comprising:
providing The device of claim 35;
flowing product into the cavity; and
dispensing the product from the cavity.

54. The method of claim 53, wherein the dispensing of the product from the cavity comprises dispensing substantially all of the product within the cavity.

55. The method of claim 53 further comprising inverting The device.

56. The method of claim 53, further comprising flowing excess product out of the cavity via the orifice.

57. A device for dispensing a product, comprising:
a container having an opening, the container being configured to contain a product;
a retaining member in the vicinity of the opening, the retaining member defining a dosing cavity for containing an amount of product capable of being dispensed when The device is in an upright orientation, the retaining member comprising a peripheral sidewall at least partially defining the cavity; and
a pump configured to dispense product contained in the dosing cavity,
wherein a portion of The device comprises an edge defining an orifice in flow communication with the container and the dosing cavity, at least part of the edge extending inside at least one of the peripheral sidewall and an extension of the peripheral sidewall at a non-zero distance therefrom, the orifice being positioned to define a maximum filling level of the dosing cavity.

58. The device according to claim 57, wherein the maximum filling level of the cavity is defined by a portion of said edge closest to said axis.

59. The device according to claim 57, further comprising a tube, wherein the orifice is formed by a free end of the tube.

60. The device according to claim 59, wherein the cavity includes a base, and wherein the tube extends in a direction substantially parallel to said longitudinal axis from the base of the cavity to the free end.

61. The device according to claim 57, wherein the retaining member comprises a second part extending from the peripheral sidewall to an interior surface of the container, the second part at least partially defining at least one passage allowing one-way flow of product from the container to the cavity in response to at least partial inversion of The device.

62. The device according to claim 61, wherein the second part comprises an elastically deformable diaphragm having a peripheral edge near the interior surface of the container, said diaphragm having a contacting portion configured to contact the interior surface of the container when The device is in the upright position and to move away from the interior surface under pressure of product in response to the at least partial inversion.

63. The device according to claim 62, wherein said contacting portion comprises an annular portion separated from a peripheral edge of said diaphragm.

64. The device according to claim 62, wherein said diaphragm comprises an elastically deformable material.

65. The device according to claim 62, wherein said diaphragm has a thickness that decreases in a direction towards the interior surface of the container.

66. The device according to claim 61, wherein said second part slopes downward in a direction of the cavity.

67. The device according to claim 61, wherein said second part comprises a second wall extending from said peripheral sidewall to an edge, the edge at least partially lying at a distance from an interior surface of the container.

68. The device according to claim 67, wherein a plurality of angularly-spaced tabs extend radially from the edge to an interior surface of the container.

69. The device according to claim 68, wherein the flexible tabs slope downward towards the cavity.

70. The device according to claim 57, wherein the retaining member comprises at least one interlocking member mounted on an edge of the opening of the container.

71. The device according to claim 57, further comprising a riser tube coupled to the pump, one end of the riser tube being substantially near a base of the cavity.

72. The device according to claim 57, further including a hoop secured to the pump, the hoop being coupled to a neck of the container.

73. The device according to claim 57, further including an actuator configured to actuate said pump.

74. A method of dispensing a product, the method comprising:

providing The device of claim 57;

flowing product into the cavity; and dispensing the product from the cavity.

75. The method of claim 74, wherein the dispensing of the product from the cavity comprises dispensing substantially all of the product within the cavity.

76. The method of claim 74, wherein the flowing of the product into the cavity comprises flowing the product into the cavity via the orifice.

77. The method of claim 74, further comprising inverting The device.

78. The method of claim 74, further comprising flowing excess product out of the cavity via the orifice.

* * * * *